J. A. ABBOTT.
ARTIFICIAL TREE.
APPLICATION FILED OCT. 29, 1917.
1,266,749.
Patented May 21, 1918.
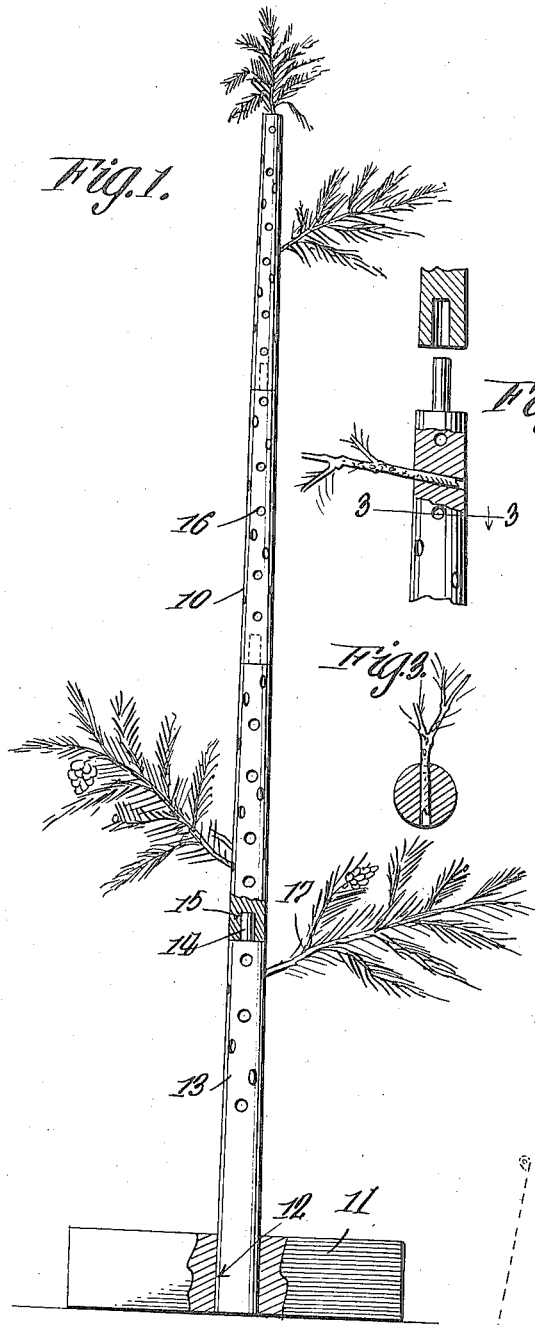
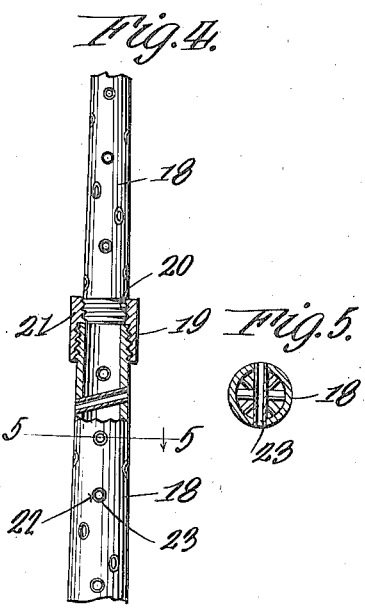
INVENTOR
James A. Abbott
ATTORNEY

UNITED STATES PATENT OFFICE.

JAMES A. ABBOTT, OF LEAVENWORTH, WASHINGTON.

ARTIFICIAL TREE.

1,266,749.  Specification of Letters Patent.  Patented May 21, 1918.

Application filed October 29, 1917. Serial No. 199,115.

*To all whom it may concern:*

Be it known that I, JAMES A. ABBOTT, a citizen of the United States, residing at Leavenworth, in the county of Chelan and State of Washington, have invented certain new and useful Improvements in Artificial Trees, of which the following is a specification.

This invention has relation to the art of decorating, and has for an object to provide a device adapted to support and be covered with natural branches and foliage whereby to simulate a tree for interior decorative purposes.

Another object of the invention is to provide a device for the purpose described consisting of a post formed in sections adapted to be disposed in a vertical position, and to support natural branches of foliage for the purpose set forth.

A still further object of the invention is to provide a device having the above described characteristics including a post formed in sections and provided with a plurality of transversely extending openings inclined at an angle to receive the ends of natural branches containing foliage whereby the post may be hidden by the foliage and a tree thus simulated for interior decorative purposes.

In addition to the foregoing my invention comprehends improvements in the details of construction and arrangements of the parts to be hereinafter more fully described and particularly set forth in the appended claims.

In the accompanying drawings in which similar and corresponding parts are designated by the same characters of reference throughout the several views in which they appear:—

Figure 1, is a view in elevation with parts broken away of a device constructed in accordance with my invention for the purpose described.

Fig. 2, is a detail view on an enlarged scale illustrating a pair of disconnected sections partly in section.

Fig. 3, is a view in horizontal section taken on the line 3—3 of the preceding figure.

Fig. 4, is a fragmentary view in elevation, partly in section of a modified form of my invention.

Fig. 5, is a horizontal section taken on the line 5—5 of Fig. 4.

Fig. 6, is a view in elevation of a portion of a still further modified form of my invention.

Fig. 7, is a detail view showing the joint of the form shown in the immediate preceding figure, and Fig. 8, is a transverse section taken on the line 8—8 of Fig. 7.

With reference to the drawings, particularly Figs. 1 to 3 inclusive, 10 indicates generally a post, tapering upward and designed to be placed in a vertical position and supported at its lower end in a base block 11, said block having an opening 12 formed therein to receive the lower end of the post.

The post is formed into a plurality of sections, each of which is indicated at 13, each section, with the exception of the top section being provided at its upper end with an upwardly extending stud 14 of a diameter less than the diameter of that section of the post to enter an opening 15 in the lower end of the next section above. In this manner, when the sections are properly associated, a uniformly upwardly tapering post is provided which may be of any height desired depending on the number of sections utilized.

Each section is then provided with a plurality of transversely extending openings 16, said openings being staggered relatively to each other and vertically spaced and preferably inclined at a slight angle to the horizontal. In order to decorate the post, natural branches indicated at 17 are trimmed to permit the ends thereof to be inserted in said openings 16, and by properly distributing the branches around the post the effect of a tree may be faithfully simulated which effect can be heightened by suitably painting or otherwise decorating the surface of the post, to resemble the trunk of a tree.

This invention is designed primarily to permit the simulation of Christmas trees for interior decoration, and to that end the branches 17 may be of pine.

I have illustrated in Figs. 4 and 5 of the drawings, a modified form of my invention, in which the post is formed of sections 18, each section being in the form of a tube or pipe tapering from end to end, and threaded at each end, the threads at one end being indicated at 19 and the threads at the other at 20. These tubular sections may be either tapering or straight as desired and of a uniform diameter, and to connect the sections together, I provide a union indicated at 21. Where adjacent ends of the sections are of different diameters, the union 21 may be internally threaded for a portion of its length with threads of one pitch to receive the correspondingly threaded end of one section and the remaining half of its length threaded in a different pitch to receive the correspondingly threaded end of the next section. The union 21 may furthermore be formed at opposite ends with openings of different diameters, and said openings threaded to receive the ends of the sections as shown in Fig. 4. In this form of my invention openings 22 are formed in the walls of the posts of the sections at opposite sides, the openings in the walls at opposite sides being in registration and vertically spaced relative to each other whereby to receive and support the ends of a transversely extending tube 23. The tubes 23 are thus disposed at an angle to the horizontal and the ends of the natural branches may be inserted in said tubular members, the tubular members being arranged around the post in staggered relation and in vertically spaced relation as shown in Fig. 4.

The form of my invention shown in Figs. 6 to 8 inclusive also permits the utilization of tubular members to form the section, said sections being indicated at 24. Each section is tapered from end to end whereby when the sections are in end to end relation a uniformly tapering post is provided, the outer surface of the sections lying flush. Each section is formed at each end and at opposite sides with spaced apertured lugs 25 whereby to receive therebetween the lugs 26 formed on one of the ends of the next adjacent sections adapted for abutting engagement therewith. The lugs of adjacent sections at one side of the post are permanently connected by means of a rivet 27 to permit however, relative rotative movement of the sections, while the lugs at the opposite sides of the post are temporarily connected by means of a removable cotter pin 28. In this manner the sections may be folded one upon the other when the cotter pins are removed to permit the post to occupy as small a space as possible for transportation. Each one of the tubular sections 24 is provided with transversely extending tubular members 29 in a manner similar to the form shown in Figs. 4 and 5 whereby to support the trimmed ends of the natural branches.

From the foregoing it will be apparent that I have devised means whereby the necessity for transporting bulky trees is obviated, enabling the construction of an artificial tree for decorative purposes, by means of small branches which can be readily packed and shipped in small bulk. It will furthermore be apparent that by the use of this invention the necessity for cutting down valuable timber is avoided as branches can be trimmed from the trees without affecting the vitality thereof and which branches will serve the same purpose when they are utilized in connection with my device, as a whole tree. Other uses and advantages will be readily apparent as the nature of my invention is better understood.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention, what I claim as new and desire to secure by Letters Patent is—

1. In a decorative device, a post formed of a plurality of tubular sections, in end to end relation, means pivotally connecting the sections to permit the same to be folded one upon another and tubular members extending transversely through each section to receive the trimmed ends of branches.

2. In a decorative device, a tubular post, and a plurality of tubular members extending transversely therethrough to receive the ends of tree branches.

3. In a decorative device, a tubular post, and a plurality of tubular members extending transversely through the post at a slight angle to the horizontal, to receive ends of tree branches.

4. In a decorative device, a tubular upright post, having opposed openings at slightly different elevations, and a tubular member having its ends trimmed at an angle to its longitudinal axis extending through said post and its ends seated in said openings thereof to receive the end of a tree branch.

In testimony whereof I affix my signature in presence of two witnesses.

JAMES A. ABBOTT.

Witnesses:
CLARENCE A. CAMPBELL,
ROBT. B. FIELD.